(12) United States Patent
Walker et al.

(10) Patent No.: US 9,100,470 B2
(45) Date of Patent: Aug. 4, 2015

(54) BIASING COMPONENT FOR RAISING AND LOWERING A KEYBOARD FOR A HANDHELD COMMUNICATION DEVICE

(75) Inventors: David Ryan Walker, Waterloo (CA); Laura Anne Steenburgh, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1532 days.

(21) Appl. No.: 12/478,996

(22) Filed: Jun. 5, 2009

(65) Prior Publication Data

US 2010/0311477 A1  Dec. 9, 2010

(51) Int. Cl.
  *H04M 1/00*  (2006.01)
  *H04M 1/23*  (2006.01)
  *G06F 1/16*  (2006.01)
  *H04M 1/02*  (2006.01)

(52) U.S. Cl.
  CPC .............. *H04M 1/23* (2013.01); *G06F 1/1616* (2013.01); *G06F 1/1624* (2013.01); *G06F 1/1662* (2013.01); *H04M 1/0216* (2013.01); *H04M 1/0237* (2013.01)

(58) Field of Classification Search
  CPC ............ H04M 1/0214; H04M 1/0245; H04M 1/0235; H04M 1/0247; H04M 1/022; H04M 1/0222; H04M 1/0241
  USPC .......... 455/575.1–575.4; 361/697.08, 679.46, 361/697.12, 697.27, 697.46
  See application file for complete search history.

(56) References Cited

U.S. PATENT DOCUMENTS

| | | | | |
|---|---|---|---|---|
| 6,028,768 | A * | 2/2000 | Cipolla | 361/679.12 |
| 6,144,554 | A * | 11/2000 | Mok | 361/679.08 |
| 7,419,099 | B2 * | 9/2008 | Lee et al. | 235/472.01 |
| 7,916,473 | B2 * | 3/2011 | Jang | 361/679.55 |
| 2003/0050019 | A1 | 3/2003 | Dowling et al. | |
| 2005/0245297 | A1 | 11/2005 | Lee et al. | |
| 2006/0164799 | A1 | 7/2006 | Varela | |
| 2008/0280658 | A1 | 11/2008 | Clemens | |
| 2009/0093285 | A1 * | 4/2009 | Weng et al. | 455/575.4 |

FOREIGN PATENT DOCUMENTS

EP  1638298 A  3/2006
EP  1667408 A  6/2006

OTHER PUBLICATIONS http://www.ubergizmo.com/15/archives/2008/09/sharp_922sh_qwerty_smartphone_good_horizontal_flipphone_design.html.
HTC S710 Vox: Retractable keyboard. Retrieved Nov. 3, 2011.
Extended European Search report dated Jan. 26, 2010. In corresponding application No. 09007480.8.

* cited by examiner

*Primary Examiner* — Golam Sorowar
(74) *Attorney, Agent, or Firm* — Fish & Richardson P.C.

(57) ABSTRACT

A clamshell or slide type of handheld wireless communication device can include a biasing component to raise or lower a keyboard relative to a first housing of the device. The biasing component can raise the keyboard when the communication device is opened and can lower the keyboard when the communication device is closed. When the keyboard is raised, the keyboard can be flush with or above the first housing or sides of the first housing of the communication device. When the keyboard is lowered, the keyboard can be below the first housing of the communication device.

19 Claims, 8 Drawing Sheets

BIASING COMPONENT FOR RAISING AND LOWERING A KEYBOARD FOR A HANDHELD COMMUNICATION DEVICE

FIELD

This disclosure, in a broad sense, is directed toward a keyboard for a handheld communication device that has wireless communication capabilities. The disclosure further relates to a keyboard for a hinged clamshell type or a slide type handheld communication device.

BACKGROUND

With the proliferation of wireless communication systems, compatible handheld communication devices are becoming more prevalent, as well as advanced. Handheld communication devices typically include a housing for accommodating internal components such as a processor and a battery, a keyboard on a front face of the device, a display screen typically adjacent to the keyboard, and a navigational input, among other things.

To protect the display or the keyboards, conventional communication devices have been constructed as a hinged clamshell design (e.g., a "flip-phone" design) or a slide design. In hinged clamshell designs, the communication device includes a first housing and a second housing which are pivotally coupled together with the communication device being fully functional when the communication device is in an open configuration, e.g., when the first and second housing are not positioned one upon the other. Similarly in slide designs, the communication device includes a first housing and a second housing with one housing residing above the other housing, with the communication device being fully functional when one of the housing slides relative to the other housing. In conventional hinged clamshell and slide configurations, the keyboards are typically flush or just below the top surface of the housing of the communication devices to provide sufficient space to close the communication devices. As a result, the keyboards may be lower than keyboards on conventional communication devices which can be awkward for a user. In addition, the sides of the housing may interfere with a user while attempting to use the keyboard.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The functions described as being performed at various components can be performed at other components, and the various components can be combined and/or separated. Other modifications also can be made.

Figure 1A:
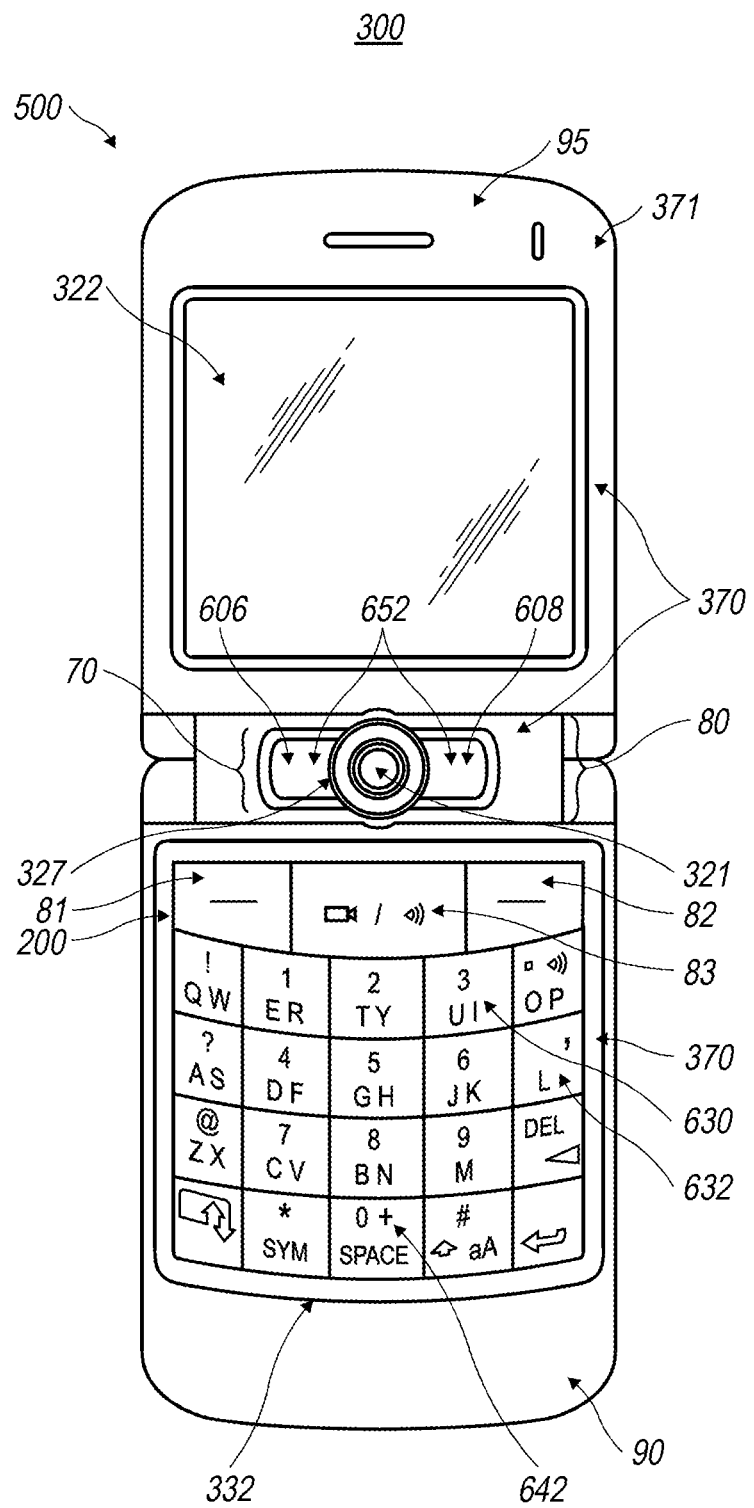
FIG. 1A illustrates a front view of a hinged clamshell type of handheld wireless communication device in an open configuration in accordance with an exemplary embodiment.
Figure 1B:
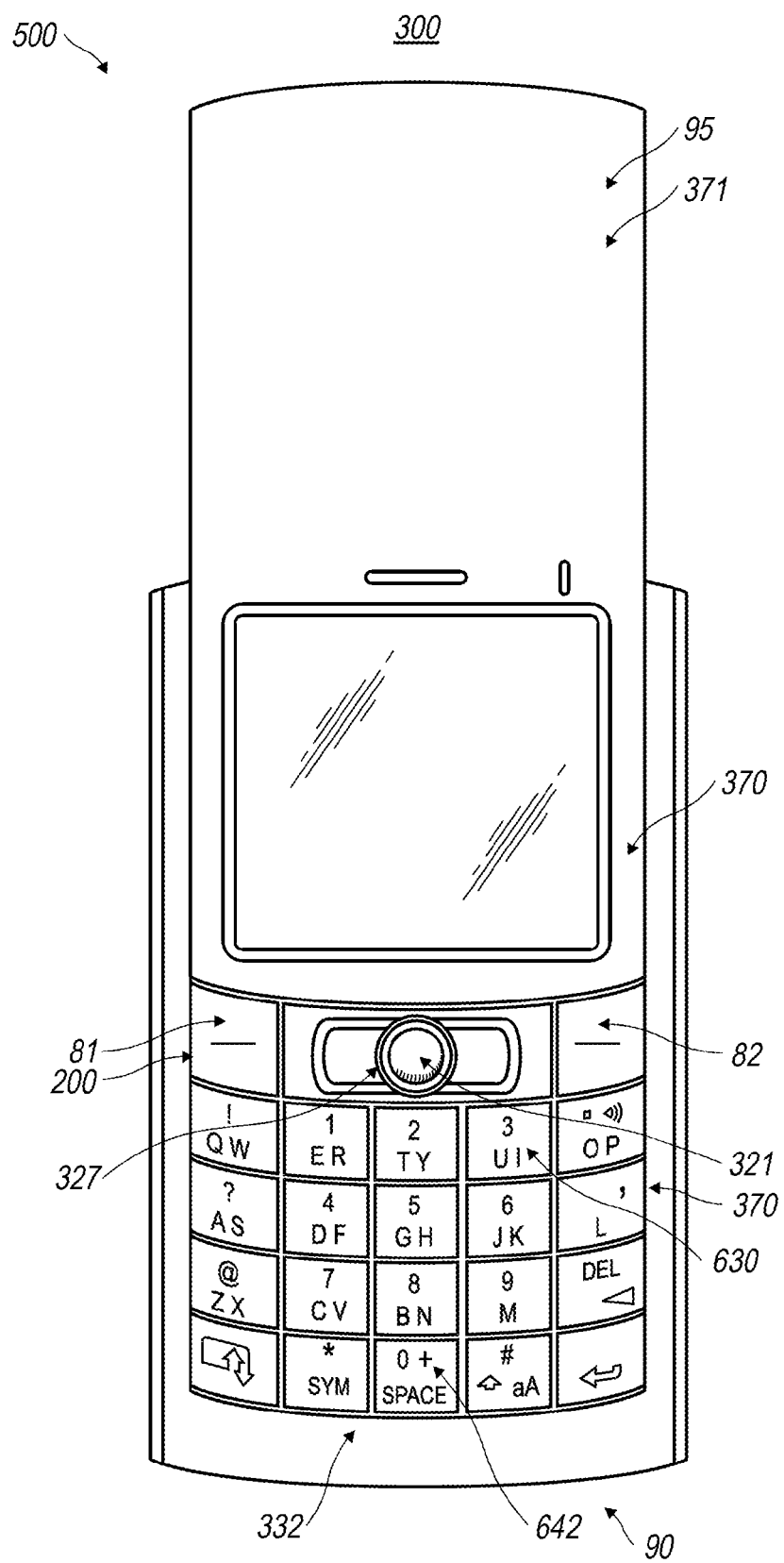
FIG. 1B illustrates a front view of a slide type of handheld wireless communication device in an open configuration in accordance with an exemplary embodiment.

Referring to FIGS. 1A and 1B, front views of a clamshell type and slider type handheld communication devices in open configurations 500 in accordance with exemplary embodiments are illustrated. The handheld wireless communication devices 300 can communicate with a wireless network 319 as exemplified in the block diagram of FIG. 2. As used herein, the term handheld electronic device describes a relatively small device that is capable of being held in a user's hand. It is a broader term that includes devices that are further classified as handheld electronic devices, which interact with a communications network. These figures are exemplary only, and those persons skilled in the art will appreciate the additional elements and modifications necessary to make the devices 300 work in particular network environments.

As shown, the handheld wireless communication devices 300 can be configured to send and receive text messages. The handheld devices 300 can include a body 371 configured to be held in one hand by an operator of the device during text entry. The communication devices 300 can include a display 322 located on a top surface 370 of the body 371 in the open configuration 500 and upon which information can be displayed to the operator during text entry. The communication can also include a keyboard 332 located on the top surface 370 of the body 371. The keyboard 332 can include a plurality of alphanumeric keys 630. A navigation row 70 can include menu keys 652 and a navigation tool 327 which can also be located on the front face 370 of the body 371 in the open configuration 500. In the clamshell configuration shown in FIG. 1A, the navigation row 70 can be located on a hinging interconnector 80, although it is appreciated that the navigation row 70 can also be located on either the first or second housings 90, 95 (not shown). The alphanumeric input keys 630 can comprise a plurality of alphabetic and/or numeric keys (632, 642) having letters and/or numbers associated therewith. The order of the letters of the alphabetic keys 632 on the illustrated handheld devices 300 can be described as being of a traditional, but non-ITU Standard E.161 layout.

The handheld wireless communication devices 300 can also be configured to send and receive voice communications such as mobile telephone calls. To facilitate telephone calls, two call keys or outer keys (not shown) can be provided in the navigation row 70 (so-called because it includes the navigation tool 327) at the outer ends of the navigation row 70. One of the two call keys can be a call initiation key, and the other can be a call termination key. The navigation row 70 can include another pair of keys ("flanking keys" 606, 608) that are located immediately adjacent to the navigation tool 327, with one flanking key on either side of the navigation tool 327. It is noted that the outer keys are referred to as such not because they are necessarily the outermost keys in the navigation row—there can be additional keys located even further outwardly of the outer keys if desired—but rather because they are located outwardly with respect to the flanking keys (606, 608). The flanking keys (606, 608) can, for instance, constitute the menu keys 652, which include a menu call-up key 606 and an escape or back key 608. The menu call-up key 606 can be used to bring up a menu on the display screen 322 and the escape key 608 can be used to return to the previous screen or previous menu selection. The functions of the call keys and the menu keys can, of course, be provided by buttons that are located elsewhere on the handheld device 300, with different functions assigned to the outer keys and the flanking keys (606, 608).

Keys, typically of a push-button or push-pad nature, perform well as data entry devices but can present problems to the user when they must also be used to affect navigational control over a screen-cursor. To address this problem, the communication devices 300 can include a trackball 321 which is exteriorly located within the navigation tool 327 of the communication devices 300. Its front location can be advantageous because it makes the tool easily thumb-actuable like the keys of the keyboard 332. The trackball 321 can instruct screen cursor movement in substantially any direction, as well as act as an actuator when the ball 321 is depressed like a button. The placement of the trackball 321 can be above the keyboard 332 and below the display screen 322; here, it can avoid interference during keyboarding and does not block the user's view of the display screen 322 during use. In other embodiments, the navigational control can include other navigational tools, such as a roller-barrel, four-way keyboard, joystick, touchpad, and trackball assembly, can be used or be located in different locations or a combination thereof.

Figure 2:
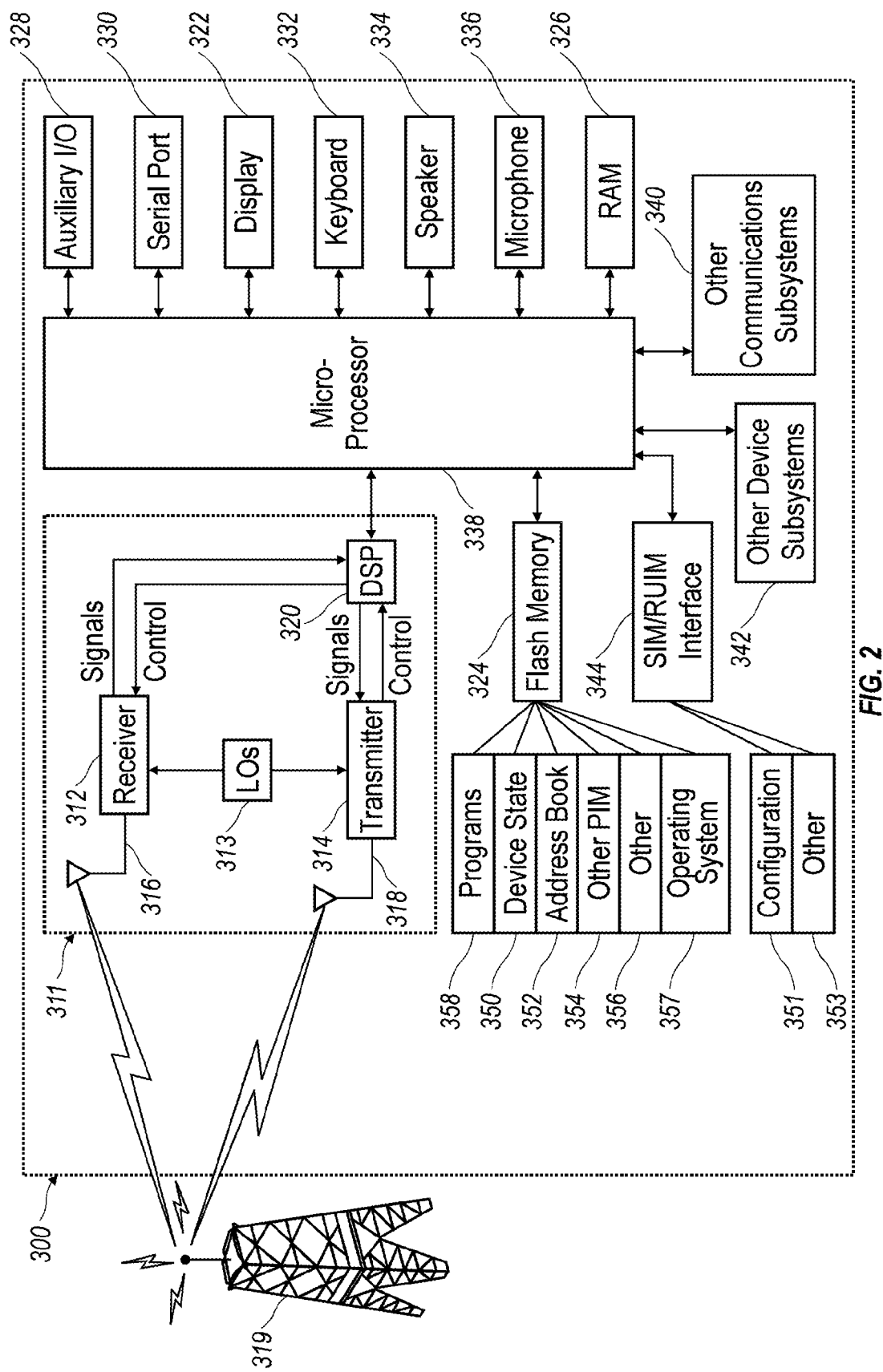
FIG. 2 is a block diagram of a wireless handheld communication device interacting in a communication network in accordance with an exemplary embodiment.

Referring to FIG. 2, a block diagram of a wireless handheld communication device 300 interacting in a communication network in accordance with an exemplary embodiment is illustrated. As used herein, the term handheld electronic device describes a relatively small device that is capable of being held in a user's hand. It is a broader term that includes devices that are further classified as handheld electronic devices, which interact with a communications network.

As shown in the block diagram of FIG. 2, the communication device 300 includes a microprocessor 338 that controls the operation of the communication device 300. A communication subsystem 311 performs all communication transmission and reception with the wireless network 319. The microprocessor 338 further can be connected with an auxiliary input/output (I/O) subsystem 328 that can be connected to the communication device 300. Additionally, in at least one embodiment, the microprocessor 338 can be connected to a serial port (for example, a Universal Serial Bus port) 330 which can allow for communication with other devices or systems via the serial port 330. A display 322 can be connected to microprocessor 338 to allow for displaying of information to an operator of the device 300. When the communication device 300 is equipped with a keyboard 332, which can be physical or virtual, the keyboard 332 can also be connected with the microprocessor 338. The communication device 300 can include a speaker 334, a microphone 336, random access memory 326 (RAM), and flash memory 324, all of which can be connected to the microprocessor 338. Additionally, a vibrator (not shown), which can be a vibrator motor, can be connected with the microprocessor 338 to generate vibrations in the communication device 300. Other similar components can be provided on the device 300 as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the communication device 300. In some embodiments not all of the above components can be included in the communication device 300. For example, in at least one embodiment the keyboard 332 is not provided as a separate component and is instead integrated with a touch-sensitive display.

Furthermore, the communication device 300 is equipped with components to enable operation of various programs, as shown in FIG. 2. In an exemplary embodiment, the flash memory 324 is enabled to provide a storage location for the operating system (not shown), device programs 358, and data. The operating system is generally configured to manage other programs 358 that are also stored in memory 324 and executable on the processor 338. The operating system honors requests for services made by programs 358 through predefined program 358 interfaces. More specifically, the operating system typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system through a user interface usually including the keyboard 332 and display screen 322. While in an exemplary embodiment the operating system is stored in flash memory 324, the operating system in other embodiments is stored in read-only memory (ROM) or similar storage element (not shown). As those skilled in the art will appreciate, the operating system, device program 358 or parts thereof can be loaded in RAM 326 or other volatile memory.

In one exemplary embodiment, the flash memory 324 contains programs 358 for execution on the communication device 300 including an address book 352, a personal information manager (PIM) 354, and the device state 350. Furthermore, programs 358 and other information 356 including data can be segregated upon storage in the flash memory 324 of the communication device 300.

When the communication device 300 is enabled for two-way communication within the wireless communication network 319, it sends and receives signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 300 can require a unique identifier to enable the communication device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in a multitude of different electronic devices 300. The communication device 300 can operate some features without a SIM/RUIM card, but a SIM/RUIM card is necessary for communication with the network 319. A SIM/RUIM interface 344 located within the communication device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled communication device 300 is able to both transmit and receive information from the communication network 319. The transfer of communication can be from the communication device 300 or to the communication device 300. In order to communicate with the communication network 319, the communication device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae 316, 318 in another exemplary embodiment are combined into a single antenna (not shown). As one skilled in the art would appreciate, the antenna or antennae 316, 318 in another embodiment are externally mounted on the communication device 300.

When equipped for two-way communication, the communication device 300 includes a communication subsystem 311. As is understood in the art, this communication subsystem 311 supports the operational needs of the communication device 300. The subsystem 311 includes a transmitter 314 and receiver 312 including the associated antenna or antennae 316, 318 as described above, local oscillators (LOs) 313, and a processing module 320 which in the presently described exemplary embodiment is a digital signal processor (DSP) 320.

It is contemplated that communication by the communication device 300 with the wireless network 319 is any type of communication that both the wireless network 319 and communication device 300 are enabled to transmit, receive and process. In general, these can be classified as voice and data. Voice communication generally refers to communication in which signals for audible sounds are transmitted by the communication device 300 through the communication network 319. Data generally refers to all other types of communication that the communication device 300 is capable of performing within the constraints of the wireless network 319. Example device applications that can depend on such data include email, contacts and calendars. For each such application, synchronization with home-based versions on the applications can be critical for either or both of their long term and short term utility. As an example, emails are often time sensitive, so substantially real time synchronization is highly desirable. Contacts, on the other hand, can be updated less frequently without inconvenience. Therefore, the utility of the handheld devices 300 can be significantly enhanced when connectable within a communication system, and particularly when connectable on a wireless basis in a network 319 (shown in FIG. 2) in which voice, text messaging, and other data transfer are accommodated.

The included auxiliary I/O subsystem 328 can take the form of a variety of different navigation tools such as a trackball 321 (shown in at least FIGS. 1A and 1B) based device or a joystick, just as examples. These navigation tools can be located on the front of the device 300 but can also be located on any exterior face of the device 300. Other auxiliary I/O devices can include external display devices and externally connected keyboards (not shown). While the above examples have been provided in relation to the auxiliary I/O subsystem 328, other subsystems capable of providing input or receiving output from the handheld communication device 300 are considered within the scope of this disclosure. Additionally, other keys can be placed along the side of the device 300 to function as escape keys, volume control keys, scrolling keys, power switches, or user programmable keys, and can likewise be programmed accordingly.

The keyboard 332 (FIGS. 1A and 1B) can include a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, or in the instance of keys located adjacent the display screen 322, the indicia can be printed on the device cover beside the key. Additionally, current indicia for the key can be temporarily shown nearby the key on the display screen 322.

In the case of virtual keys, the indicia for the respective keys can be shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touch screens.

Physical and virtual keys can be combined in many different ways as appreciated by those skilled in the art. In one embodiment, physical and virtual keys can be combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands, and functions associated with keyboard typing in general are traditionally arranged using various conventions. The most common of these in the United States, for instance, is the QWERTY keyboard layout. Others include the reduced QWERTY (shown in FIGS. 1A and 1B, for example), QWERTZ, AZERTY, and Dvorak keyboard configurations.

It is often desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. Although the handheld device 300 is not limited to this configuration, for the purposes of this disclosure, a reduced QWERTY keyboard is utilized, as shown in FIGS. 1A and 1B.

Referring still to FIGS. 1A and 1B, the handheld electronic communication devices 300 can include a navigation input device 327. As shown in FIG. 1A, the clamshell handheld communication device 300 can consist of three pieces, a first housing 90 and a second housing 95, which are pivotally coupled one to the other at a hinging interconnector 80. Additionally, a keyboard 332 can be located on the first housing 90 and the display screen 322 can be located on the second housing 95. Furthermore, the navigation input device 327 can be mounted on the hinging interconnector 80. In other embodiments, the navigation input device 327 can reside in the first housing 90 (as shown in FIG. 1B) or in the second housing 95 (not shown). In other embodiments, the navigation input device 327 can reside in the keyboard 332 and can be raised and lowered by the biasing component as described below.

The keyboard 332 of the first housing 90 can have a variety of different keys each associated with at least one of an alphabetic letter, a numeral, a command and a function. As illustrated in FIG. 1A, the first row 200 can include three keys—a left menu selection key 81, a right menu selection key 82, and a camera" key 83 in the center. The left menu key 81 and right menu key 82 can be used to input a respective function shown on the bottom left and right portions of the display screen 322. For example, in one embodiment, when the communication device 300 is in the open configuration 500, the "message" function can be listed on the bottom left of the display screen 322 and the "contacts" function can be listed on the bottom right of the display screen 332. The "message" function can be associated with a program that allows a user to enter a messaging application that is capable of creating, sending or editing messages which can include at least one of SMS, MMS, and email. Similarly, the "contacts" function presents a user a listing of names and addresses. According to the present teachings, the user would input the left menu key 81 to select the "message" function. Likewise, the user would input the right menu key 82 to select the "contacts" function. In a similar manner, other user selectable functions that appear in the bottom left and right portions of the screen can be selected by the user as described above. In addition, while the menu selection keys (81, 82) have been described as activating functions shown on the bottom left and right portions of the display screen 322, the functions need not be limited to those particular positions. The center key 83 in the first row 200 can be a camera key which allows a user to activate the camera option when using the telephone functionality on the device 300. Other functions known to one skilled in the art can be likewise programmed into the first row 200.

In addition as shown in FIG. 1A, both the first housing 90 and second housing 95 can have a recess (not shown) defined in each of the housings that receives at least a portion of the trackball 321 when the device 300 is in a closed configuration 400 (shown in FIGS. 3A, 4A, 5A, 6E and 7C). In this configuration, the hinging interconnector 80 provides a mounting platform for the trackball 321 and the first housing 90 and second housing 95 accommodate for a protruding trackball 321 with the recess being defined in the respective housing. In other embodiments, the recess can be provided only on the first housing 90 or only on the second housing 95.

Additionally, in one embodiment at least one input key can be mounted adjacent the trackball 321 on the hinging interconnector 80. In other embodiments as illustrated by FIGS. 1A and 1B, two input keys, each one flanking the trackball 321 on the hinging interconnector 80, can be provided. As discussed previously, the input key immediately to the left of the trackball 321 can be a menu key 606 and the input key immediately to the right of the trackball can be an escape key 608. In yet another embodiment, additional keys can be provided on the hinging interconnector 80. In one embodiment, the hinging interconnector 80 and the first and second housing (90, 95) have approximately the same width relative the clamshell handheld electronic communication device 300 in the closed configuration 400. In another embodiment, the hinging interconnector 80 can have a width approximately one-half the width of either of the first and second housings (90, 95) relative the clamshell handheld electronic communication device 300 in the closed configuration 400. FIG. 1A illustrates an embodiment in which the hinging interconnector 80 is approximately three-fourth the width of either the first and second housings (90, 95) relative the clamshell handheld electronic communication device 300 in the closed configuration 400. However, hinging interconnectors 80 of various widths, as would be recognized by one skilled in the art, are encompassed within the present disclosure. A microprocessor 338 can be housed within the device 300 and is configured to receive and process input data from the keyboard 332 and trackball 321 such that it outputs corresponding display instructional data to the display screen 322.

Reference will now be made to FIGS. 3A-7C, which illustrate various biasing components configured for raising and lowering the keyboard 332 relative to the first housing 90 when the device 300 is being opened and closed. As indicated briefly above, in conventional clamshell and slider phone configurations, the keyboard is typically slightly lower than the top surface of the housing in which it is located, to provide clearance for proper closing of the device. Such a conventional keyboard configuration can make it difficult for the user to effectively and easily operate the keyboard, as the sides of the first housing can interfere with the user's fingers while typing. The below-described biasing components address this issue by raising the keyboard 332 as the device is moved into the open configuration, enabling the keyboard to be raised above the top surface of the first housing 90 and providing for efficient use of the keyboard during operation of the device 300. To prevent damage to the keyboard 332 and corresponding display 322, the keyboard is lowered as the device is moved into the closed configuration. Each of the respective biasing components will now be described in further detail.

Figure 3A:
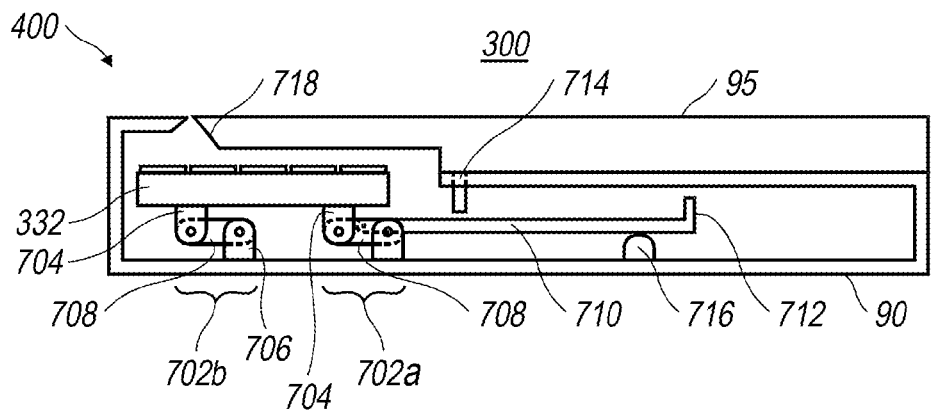
FIG. 3A illustrates a side view of a first biasing component for a slide type communication device with the communication device in a closed configuration in accordance with an exemplary embodiment.
Figure 3B:
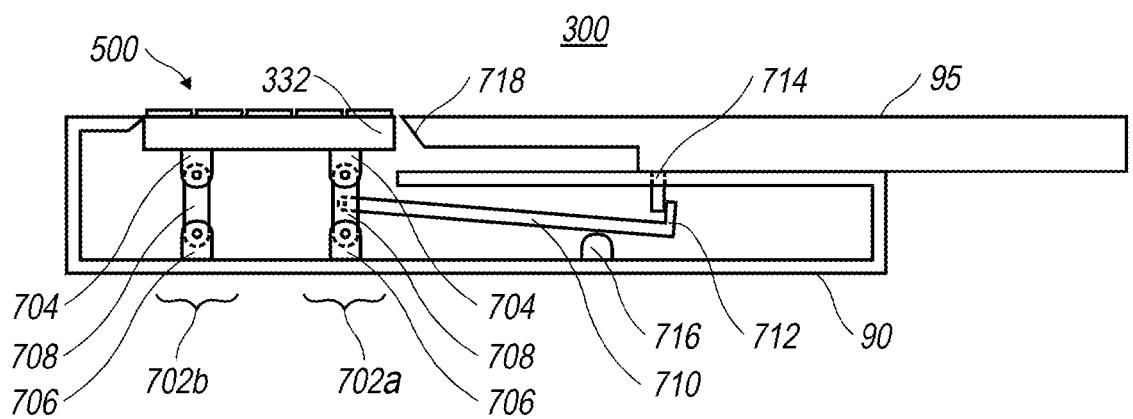
FIG. 3B illustrates a side view of a first biasing component for a slide type communication device with the communication device in an open configuration in accordance with an exemplary embodiment.

Referring first to FIGS. 3A and 3B, side views of a slide type communication device 300 having a first biasing component with the communication device in a closed configuration 400 and in an open configuration 500, respectively, in accordance with exemplary embodiments, are illustrated. As shown, the biasing component can include two linkage systems 702a, 702b. In other embodiments, the biasing component can include more or less linkage systems 702a, 702b. Each linkage system 702a, 702b can include a first linkage 704 coupled to the keyboard 332, a second linkage 706 coupled to the first housing 90 and a third linkage 708 coupled to the first linkage 704 and the second linkage 706. The first linkage 704 and second linkage 706 can have limited movement, e.g., by being fixedly coupled to the keyboard 332 and first housing 90, respectively. The third linkage 708 can move from a first position when the communication device 300 is closed (FIG. 3A) to a second position when the communication device 300 is opened (FIG. 3B). For example, the third linkage 708 can be in a horizontal position, e.g., co-planar with the keyboard 332, when the communication device 300 is closed and the keyboard 332 is lowered (FIG. 3A), and can move to a vertical position, e.g., perpendicular to the keyboard 332, when the communication device 300 is opened and the keyboard 332 is raised (FIG. 3B). The biasing component can include an activation linkage 710 coupled to the third linkage 708 and can cause the third linkage 708 to move between the first position and second position in response to the communication device 300 changing between a closed configuration 400 and an open configuration 500.

The activation linkage 710 can include an activation arm 712 provided distally from the linkage system and configured to interact with a catch 714 coupled to the second housing 95. When the second housing 95 slides away from the first housing 90, e.g., when the communication device 300 is being opened, the catch 714 on the second housing 95 can force the activation arm 712 on the activation linkage 710 to move or tilt. This action results in the activation arm 712 pulling the third linkage 708 into the second position, e.g., vertical position, causing the keyboard 332 to rise. When the second housing 95 slides towards the first housing 90, e.g., when the communication device 300 is being closed, the keyboard 332 can be lowered. In one or more embodiments, the second housing 95 can include a slanted leading edge 718. When the second housing 95 is moved towards the first housing 90, the slanted leading edge 718 can contact the keyboard 332 and cause the keyboard 332 to move from the raised (stable or locked) position to the lowered (unlocked) position. Specifically, the slanted leading edge 718 can contact the keyboard 332 causing the linkage systems 702a, 702b to change positions, e.g., from the raised position to the lowered position. In one or more embodiments, each linkage system 702 can include one or more springs (not shown) to bias the keyboard 332 toward the lowered position. The one or more springs can be implemented such that when the keyboard 332 is in the raised position, the one or more springs can assist in maintaining the keyboard 332 in the raised position and once the slanted leading edge 718 causes the keyboard 332 to unlock from that position, the one or more springs can assist in lowering the keyboard 332 to the lowered position. A fourth linkage 716 can be coupled to or can provide support for the activation linkage 710. The first linkage 704, second linkage 706, third linkage 708 and fourth linkage 716 can be pin joint linkages, although it is recognized that other types of linkages may be suitable.

Figure 4A:
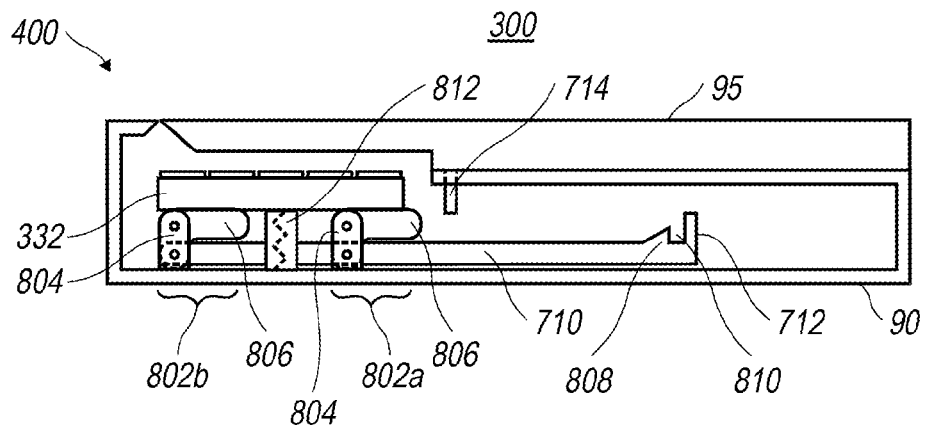
FIG. 4A illustrates a side view of a second biasing component for a slide type communication device with the communication device in a closed configuration in accordance with an exemplary embodiment.
Figure 4B:
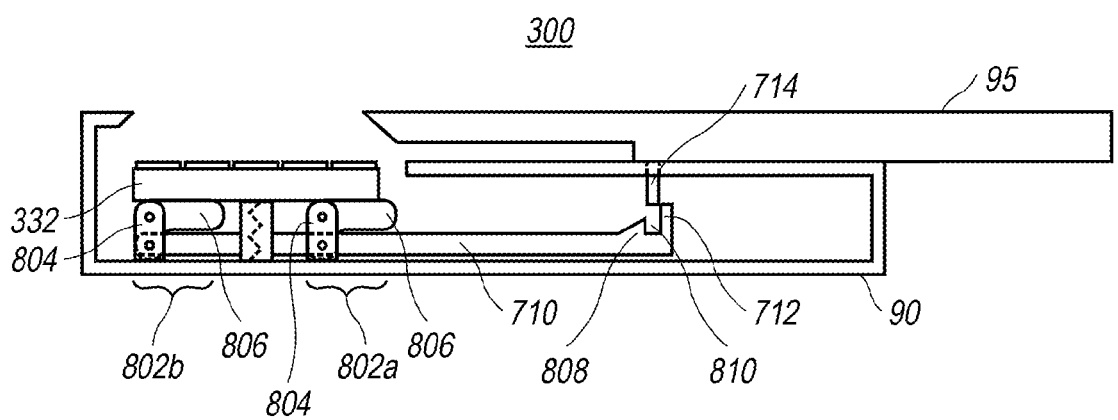
FIG. 4B illustrates a side view of a second biasing component for a slide type communication device with the communication device in a partially open configuration with the keyboard in a lowered position in accordance with an exemplary embodiment.
Figure 4C:
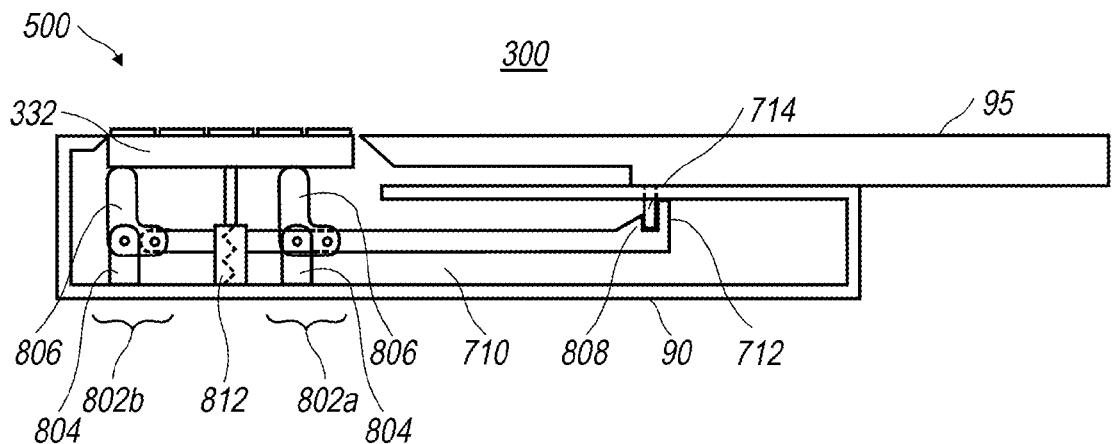
FIG. 4C illustrates a side view of a second biasing component for a slide type communication device with the communication device in an open configuration with the keyboard in a raised position in accordance with an exemplary embodiment.

Referring to FIGS. 4A, 4B and 4C, side views of slide type communication devices having a second biasing component with the communication device in a closed configuration, a partially open configuration and in an open configuration, respectively, in accordance with exemplary embodiments, are illustrated. As shown, the biasing component can include two linkage systems 802a, 802b. In other embodiments, the biasing component can include more or less linkage systems 802a, 802b. Each linkage system 802a, 802b can include a first linkage 804 coupled to the first housing 90 and a second linkage 806 coupled to the keyboard 332 and the first linkage 804. The first linkage 804 can have limited movement, e.g., be fixedly coupled to the first housing 90. The second linkage 806 can move from a first position when the communication device 300 is closed to a second position when the communication device 300 is opened. For example, the second linkage 806 can be "L" shaped with the longer segment of the second linkage 806 being in a horizontal position, e.g., co-planar with the keyboard 332, when the communication device 300 is closed and can move to a vertical position, e.g., perpendicular to the keyboard 332, when the communication device 300 is opened. The biasing component can include an activation linkage 710 coupled to the second linkage 806 and can cause the second linkage 806 to move between the first position and second position in response to the communication device 300 changing between a closed configuration 400 and an open configuration 500.

The activation linkage 710 can include an activation arm 712 configured to interact with a catch 714 coupled to the second housing 95. In one or more embodiments, the activation linkage 710 can include a ramp 808 and can define a notch 810 between the ramp 808 and the activation arm 712. The notch 810 can be configured to receive the catch 714 as shown in FIG. 4C with the communication device 300 being in the open configuration. When the second housing 95 slides away from the first housing 90, e.g., when the communication device 300 is being opened, the catch 714 can contact the activation arm 712 as shown in FIG. 4B. In response to the catch 714 contacting the activation arm 712, the catch 714 can move into the notch 810 causing the activation linkage 710 to move, thereby pulling the second linkage 806 into the second position, e.g., vertical position, which causes the coupled keyboard 332 to rise as shown in FIG. 4C. In other words, since activation linkage 710 is coupled to the second linkage 806, the activation arm 712 is raised in response to the communication device 300 being opened and the catch 714 slides into the notch 810. When the second housing 95 slides towards the first housing 90, e.g., when the communication device 300 is being closed, the keyboard 332 can be lowered. Specifically, upon the communication device 300 being closed, the catch 714 can initially exert a horizontal force against the ramp 808 thereby initiating the lowering of the keyboard 332 until the activation arm 712 is lowered enough, thereby releasing the catch 714 from the notch 810. As explained below, one or more tension spring and damper systems 812 can continue to assist in lowering the keyboard 332. In one or more embodiments, the first linkage 804 can be a cam and the keyboard 332 can be a rocker, although it is recognized that alternative linkage systems may be appropriate.

Figure 5A:
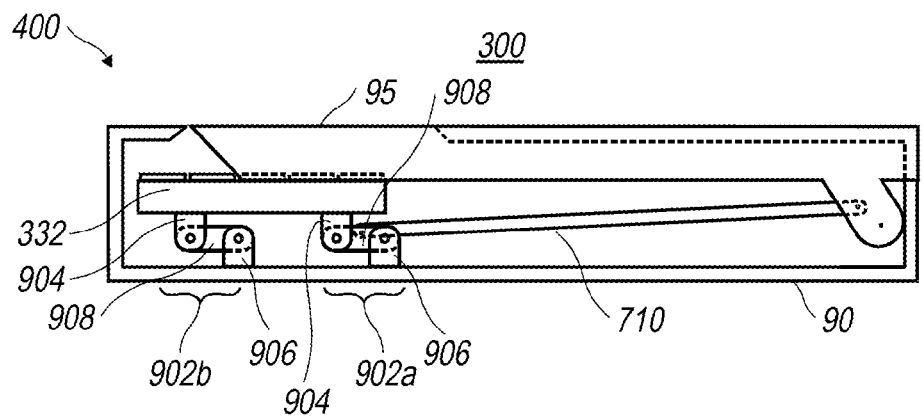
FIG. 5A illustrates a side view of a biasing component for a clamshell type communication device with the communication device in a closed configuration in accordance with an exemplary embodiment.
Figure 5B:
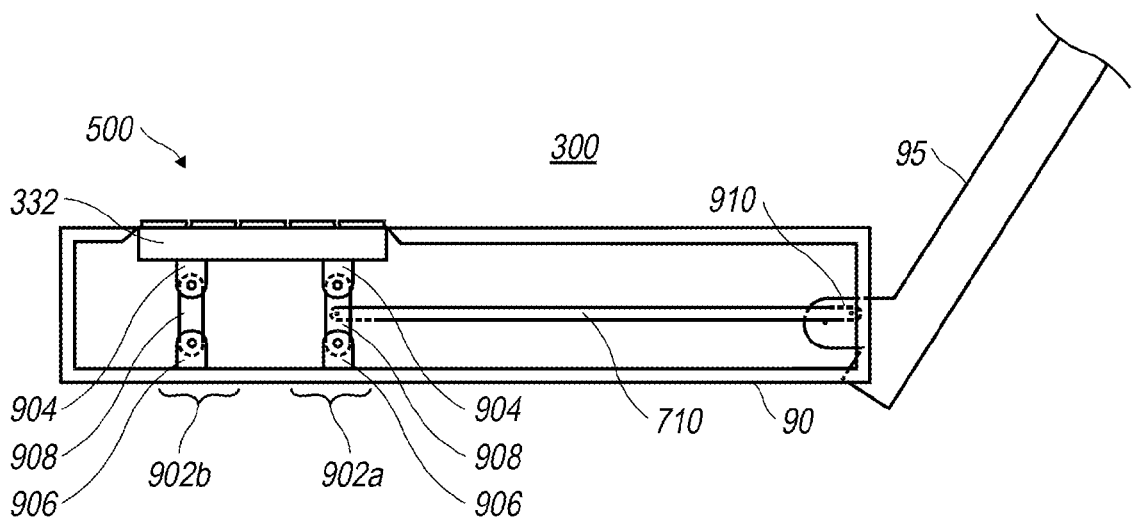
FIG. 5B illustrates a side view of a biasing component for a clamshell type communication device with the communication device in an open configuration in accordance with an exemplary embodiment.

Referring to FIGS. 5A and 5B, side views of a biasing component for a clamshell type communication device with the communication device in a closed configuration and in an open configuration, respectively, in accordance with exemplary embodiments, are illustrated. As shown, the biasing component can include two linkage systems 902a, 902b. In other embodiments, the biasing component can include more or less linkage systems 902a, 902b. Each linkage system 902a, 902b can include a first linkage 904 coupled to the keyboard 332, a second linkage 906 coupled to the first housing 90 and a third linkage 908 coupled to the first linkage 904 and the second linkage 906. The first linkage 904 and second linkage 906 can have limited movement, e.g., be fixedly coupled to the keyboard 332 and first housing 90, respectively. The third linkage 908 can move from a first position when the communication device 300 is closed to a second position when the communication device 300 is opened. For example, the third linkage 908 can be in a horizontal position, e.g., co-planar with the keyboard 332, when the communication device 300 is closed, and move to a vertical position, e.g., perpendicular to the keyboard 332, when the communication device 300 is opened. The biasing component can include an activation linkage 710 coupled to the third linkage 908 and can cause the third linkage 908 to move between the first position and second position in response to the communication device 300 changing between a closed configuration 400 and an open configuration 500.

The activation linkage 710 can be coupled to a fourth linkage 910. The fourth linkage 910 can be part of, e.g., integrated into, or can be coupled to the second housing 95. When the second housing 95 pivots away from the first housing 90, e.g., when the communication device 300 is being opened, the fourth linkage 910 can cause the activation arm 710 to move, thereby causing the third linkage 908 to move into the second position, e.g., vertical position, which can cause the coupled keyboard 332 to raise. When the second housing 95 slides towards the first housing 90, e.g., when the communication is being closed, the keyboard 332 can be lowered. The first linkage 904, second linkage 906, third linkage 908 and fourth linkage 910 can be pin joint linkages, although it is recognized that other types of linkages may be suitable.

FIGS. 3A, 3B, 4A, 4B, 4C, 5A, and 5B show various exemplary embodiments of the biasing components, however one of ordinary skill can use other biasing components or use various versions of the described biasing components. Regardless of which biasing component or components that are used, the biasing component can assist in raising the keyboard 332 when the communication device 300 moves from the closed configuration 400 to the open configuration 500 and can assist in lowering the keyboard 332 when the communication device 300 moves from the open configuration 500 to the closed configuration 400. In one or more embodiments, a plurality of biasing components can be used. For example, there can be four linkage systems 702, 802, 902 with two of the linkage systems 702, 802, 902 on one side of the communication device 300 as shown in FIGS. 3A, 3B, 4A, 4B, 4C, 5A, and 5B, and two more linkage systems 702, 802, 902 on the other side of the communication system (e.g., a mirrored set of linkage systems 702, 802, 902). Each of the linkage systems 702, 802, 902 on one side can have an activation linkage 710 coupling one or more of those linkage systems 702, 802, 902 to the second housing 95. In one or more embodiments, a single activation linkage 710 can be used and can be attached to one or more of the linkage systems 702, 802, 902.

In one or more embodiments, an activation arm 712 can be coupled to the biasing component and to the second housing so that when the second housing 95 moves from the closed configuration 400 to the open configuration 500, the activation arm 712 can assist in raising the keyboard 332, and lowering the keyboard when the second housing 95 moves from the open configuration 400 to the closed configuration 500. In addition, the activation arm 712 in FIGS. 4A and 4B can be used with the linkage systems 702 shown in FIGS. 3A and 3B. In one or more embodiments, the activation linkage 710 can be coupled to one or more linkage systems 802 as shown in FIGS. 4A and 4B. In or more embodiments, the communication device 300 can include one or more tension spring and damper systems 812 to assist in the raising and lowering of the keyboard 332 as shown in FIGS. 4A and 4B. As shown in FIG. 4A, the one or more tension spring and damper systems 812 are shown in the lowered position and in FIG. 4B, the one or more tension spring and damper systems 812 are shown in the raised position. The one or more tension spring and damper systems 812 can be used to assist the linkage system 702, 802, 902 in raising and lowering the keyboard 332.

Figure 6A:
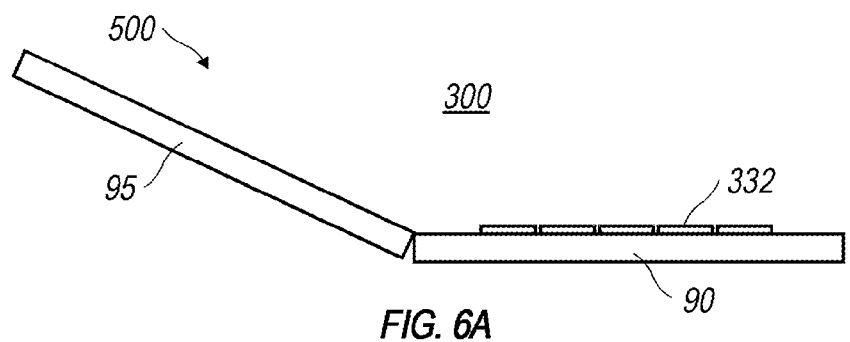
FIGS. 6A-6E illustrate side views of a clamshell type communication device in various positions in accordance with exemplary embodiments.
Figure 6B:
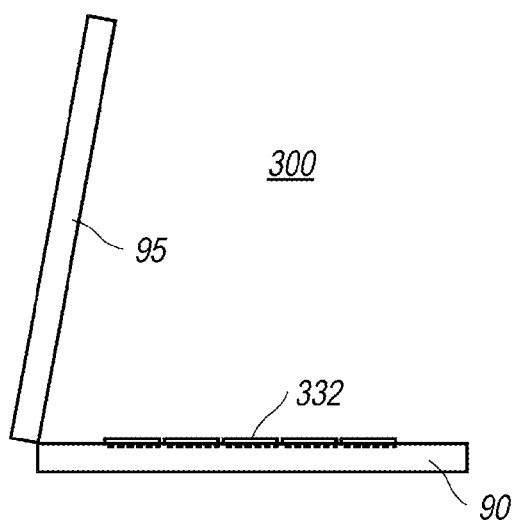
Figure 6C:
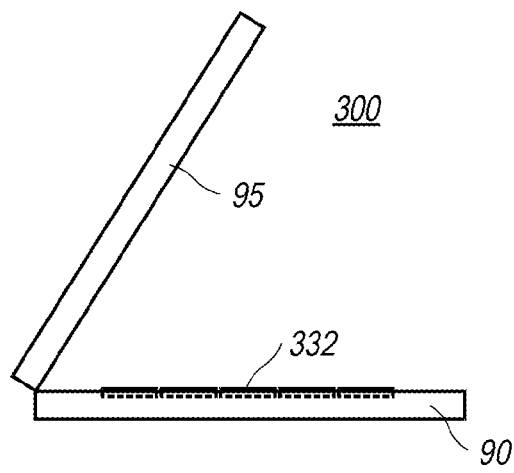
Figure 6D:
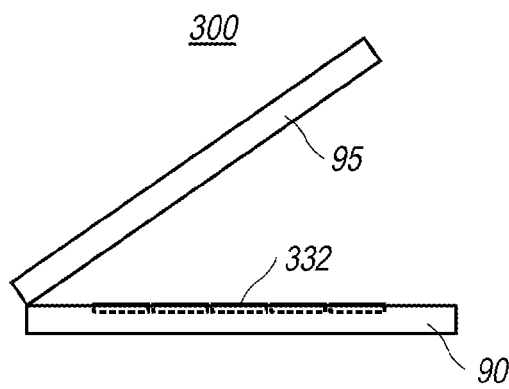
Figure 6E:
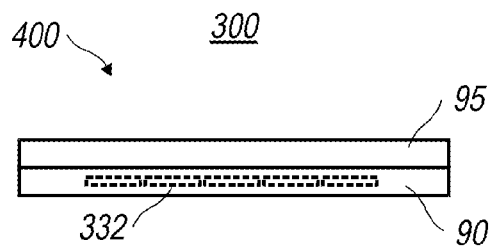

Referring to FIGS. 6A-6E, side views of a clamshell type communication device 300 having a keyboard 332 in various positions in accordance with exemplary embodiments are illustrated. As shown in FIG. 6A, the communication device 300 can be in an open configuration 500 with the keyboard 332 in the raised position. In the open configuration 500, the keyboard 332 can be flush or higher than the top surface 370 of the first housing 90. As shown in FIGS. 6B-6D, the second housing 95 can be moved towards the first housing 90 with the biasing component (not shown) lowering the keyboard 332. As shown in FIG. 6E, the communication device 300 can be in the closed configuration 400 with the keyboard 332 in the lowered position and the second housing 95 positioned above the first housing 90. In the closed configuration 400, the keyboard 332 can be lower than the top surface 370 of the first housing 90.

Figure 7A:
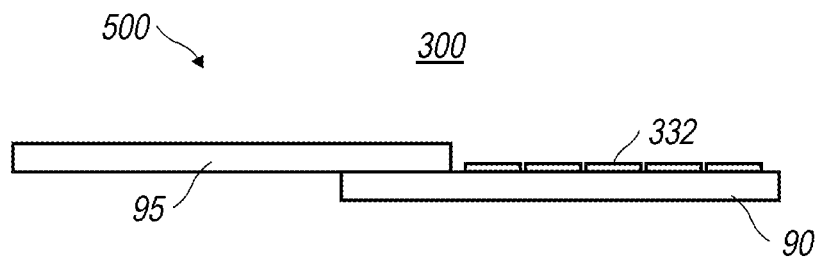
FIGS. 7A-7C illustrate side views of a slide type communication device in various positions in accordance with exemplary embodiments.
Figure 7B:
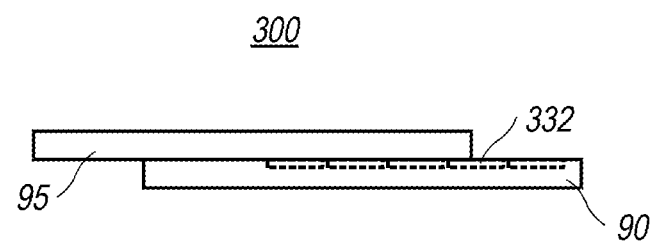
Figure 7C:
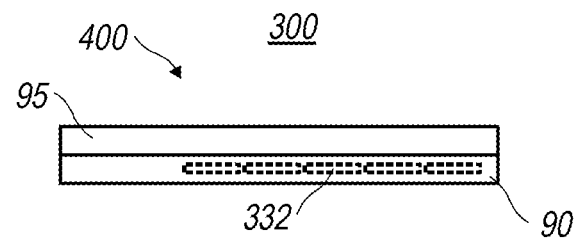

Referring to FIGS. 7A-7C, side views of a slide type communication device 300 having a keyboard 332 in various positions in accordance with exemplary embodiments are illustrated. As shown in FIG. 7A, the communication device 300 can be in the open configuration 500 with the keyboard 332 in the raised position. In the open configuration 500, the keyboard 332 can be flush or higher than the top surface 370 of the first housing 90. As shown in FIG. 7B, the second housing 95 can be slid toward the first housing 90 with the biasing component (not shown) lowering the keyboard 332. As shown in FIG. 7C, the communication device 300 is in the closed configuration 400 with the keyboard 332 in the lowered position and the second housing 95 positioned above the first housing 90. In the closed configuration 400, the keyboard 332 can be lower than the top surface 370 of the first housing 90.

In the preceding specification, various preferred embodiments have been described with reference to the accompanying drawings. It will, however, be evident that various modifications and changes can be made thereto, and additional embodiments can be implemented, without departing from the broader scope of the disclosure as set forth in the claims that follow. The specification and drawings are accordingly to be regarded in an illustrative rather than restrictive sense.

What is claimed is:

1. A handheld communication device comprising:
a first housing comprising a keyboard and at least one biasing component being coupled to the keyboard; and
a second housing that slidingly engages the first housing and substantially covering the keyboard in a closed position;
wherein when the second housing slides to an open position, the biasing component raises the keyboard relative to the first housing.

2. The handheld communication device of claim 1 wherein the first housing further comprises a top surface and the keyboard is below the top surface in the event the second housing is in the closed position.

3. The handheld communication device of claim 2 wherein the keyboard is flush with the top surface of the first housing in the event the second housing is in the open position.

4. The handheld communication device of claim 2 wherein the keyboard is above the top surface of the first housing in the event the second housing is in the open position.

5. The handheld communication device of claim 1 wherein the biasing component comprises:
at least one linkage system coupled to the keyboard; and
an activation linkage coupled to the at least one linkage system and to the second housing and configured to move the linkage system thereby raising the keyboard in response to the second housing being moved to the open position.

6. The handheld communication device of claim 5 where the second housing further comprises a catch and the activation linkage defines a notch configured to receive the catch in the event the second housing is moved to an open position.

7. The handheld communication device of claim 5 wherein the at least one linkage system comprises:
a first linkage coupled to the keyboard;
a second linkage coupled to the first housing; and
a third linkage coupled to the first linkage, second linkage and the activation linkage;
wherein in response to the second housing being moved to an open position, the third linkage moves from a first position to a second position thereby causing the keyboard to raise relative to the first housing.

8. The handheld communication device of claim 7 wherein the first linkage, second linkage and third linkage are pin joint linkages.

9. The handheld communication device of claim 8 wherein the first linkage is a cam and the keyboard is a rocker.

10. The handheld communication device of claim 5 wherein the activation linkage includes an activation arm that is coupled to a fourth linkage, the fourth linkage being coupled to the second housing.

11. The handheld communication device of claim 5 wherein the at least one linkage system comprises:
a first linkage coupled to the keyboard and to the activation linkage; and
a second linkage coupled to the first housing and to the first linkage;
wherein in response to the second housing being moved to the open position, the first linkage moves from a first position to a second position thereby causing the keyboard to raise relative to the first housing.

12. The handheld communication device of claim 1 wherein the keyboard further comprises alphanumeric keys arranged in one of a QWERTY, reduced QWERTY, QWERTZ, AZERTY, or Dvorak layout.

13. The handheld communication device of claim 1 wherein the first housing further comprises a navigation tool.

14. The handheld communication device of claim 13 wherein the navigation tool is one of a roller-barrel, four-way keyboard, joystick, touchpad, and trackball assembly.

15. The handheld communication device of claim 13 wherein the second housing substantially covers the navigation tool in the event the communication device is in the closed position.

16. The handheld communication device of claim 1 wherein the first housing further comprises a display screen.

17. The handheld communication device of claim 1 wherein the first housing and second housing are pivotally coupled.

18. The handheld communication device of claim 1 further comprising a processor housed within the device and configured to receive input data from the keyboard and navigation tool, process the input data, and output corresponding display instructional data to a display screen in the first housing.

19. The handheld communication device of claim 1 wherein the processor is further configured to transmit and receive voice and data communications.

* * * * *